(12) United States Patent
Burkett et al.

(10) Patent No.: US 8,691,070 B1
(45) Date of Patent: Apr. 8, 2014

(54) ELECTROLYSIS SYSTEM FOR GENERATING HYDROGEN GAS

(76) Inventors: William J. Burkett, Bluford, IL (US); Kenneth Buchanan, Mt. Vernon, IL (US)

( * ) Notice: Subject to any disclaimer, the term of this patent is extended or adjusted under 35 U.S.C. 154(b) by 307 days.

(21) Appl. No.: 13/105,420

(22) Filed: May 11, 2011

(51) Int. Cl.
C25B 1/00 (2006.01)
C25B 1/02 (2006.01)
C25B 1/04 (2006.01)

(52) U.S. Cl.
USPC ........................................ 205/637; 205/628

(58) Field of Classification Search
USPC ........................................ 205/674, 628, 637
See application file for complete search history.

(56) References Cited

U.S. PATENT DOCUMENTS

| | | | |
|---|---|---|---|
| 3,766,719 A | 10/1973 | McAnally, III | |
| 4,024,848 A | 5/1977 | Lee | |
| 5,096,549 A | 3/1992 | Yamauchi et al. | |
| 5,840,104 A | 11/1998 | Hashimoto et al. | |
| D466,969 S | 12/2002 | Druga | |
| 6,823,659 B2 | 11/2004 | Hiratsuka et al. | |
| 2002/0166546 A1* | 11/2002 | Andrews et al. | 123/556 |
| 2009/0283418 A1* | 11/2009 | Martin et al. | 205/464 |
| 2010/0032221 A1* | 2/2010 | Storey | 180/69.5 |

* cited by examiner

Primary Examiner — Luan Van
Assistant Examiner — Ho-Sung Chung

(57) ABSTRACT

An electrolysis system which comprises a generator adapted to hold water and gases with a first and second electrode, a bubbler reservoir connected to the generator via hoses adapted to dispense water from the bubbler reservoir into the generator and adapted to allow oxygen and hydrogen gas from the generator to rise into the bubbler reservoir with dryers adapted to hold water and gases fluidly, deliver oxygen and hydrogen gas, to hold acetic add and gases, and adapted to connect to an engine, allowing hydrogen gas to pass to the engine, and a controller connected with electrodes to provide an electric current so that water in the generator is converted to oxygen and hydrogen gas via standard electrolysis.

11 Claims, 3 Drawing Sheets

ELECTROLYSIS SYSTEM FOR GENERATING HYDROGEN GAS

FIELD OF THE INVENTION

The present invention is directed to an electrolysis system for generating hydrogen gas. The electrolysis system of the present invention provides a more economical, efficient and environmentally friendly way of reducing exhaust and pollution from trucks.

BACKGROUND OF THE INVENTION

The Electrolysis of water is the decomposition of water into oxygen and hydrogen gas ($H_2$) due to an electric current being passed through the water. In the present invention, water is subjected to an electric current in the generator (there are electrodes in the generator) and the controller provides the electric current to the electrodes. In the present invention, water is added to the bubbler reservoir and from there it is delivered to the generator via the first hose. After electrolysis occurs, the gases (hydrogen and oxygen) go through the second hose back to the bubbler reservoir. The gases rise in the bubbler (e.g., creates bubbles in the water present in the bubbler reservoir) and are delivered from the top of the bubbler reservoir to the first dryer via the third hose. The first dryer contains water. From the first dryer, the hydrogen gas passes via the fourth hose to the second dryer. The second dryer contains acetic acid (e.g., distilled vinegar). From the second dryer, the hydrogen gas passes to the engine via the fifth hose. There may be a fan (and/or other temperature control systems), which can help control temperature and help prevent overheating (or over cooling).

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
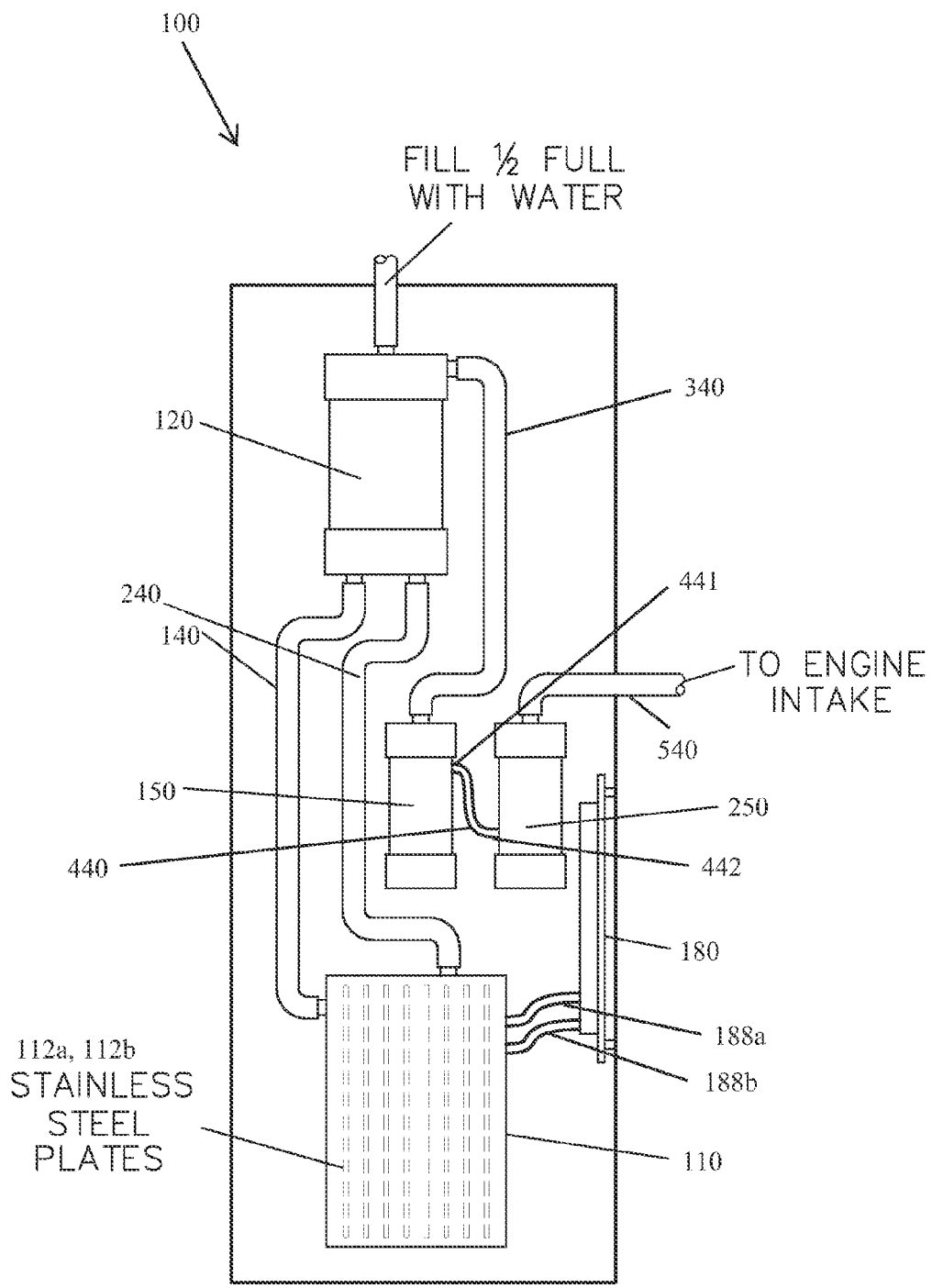
FIG. 1 is a perspective view of an electrolysis system for generating hydrogen gas.
Figure 2:
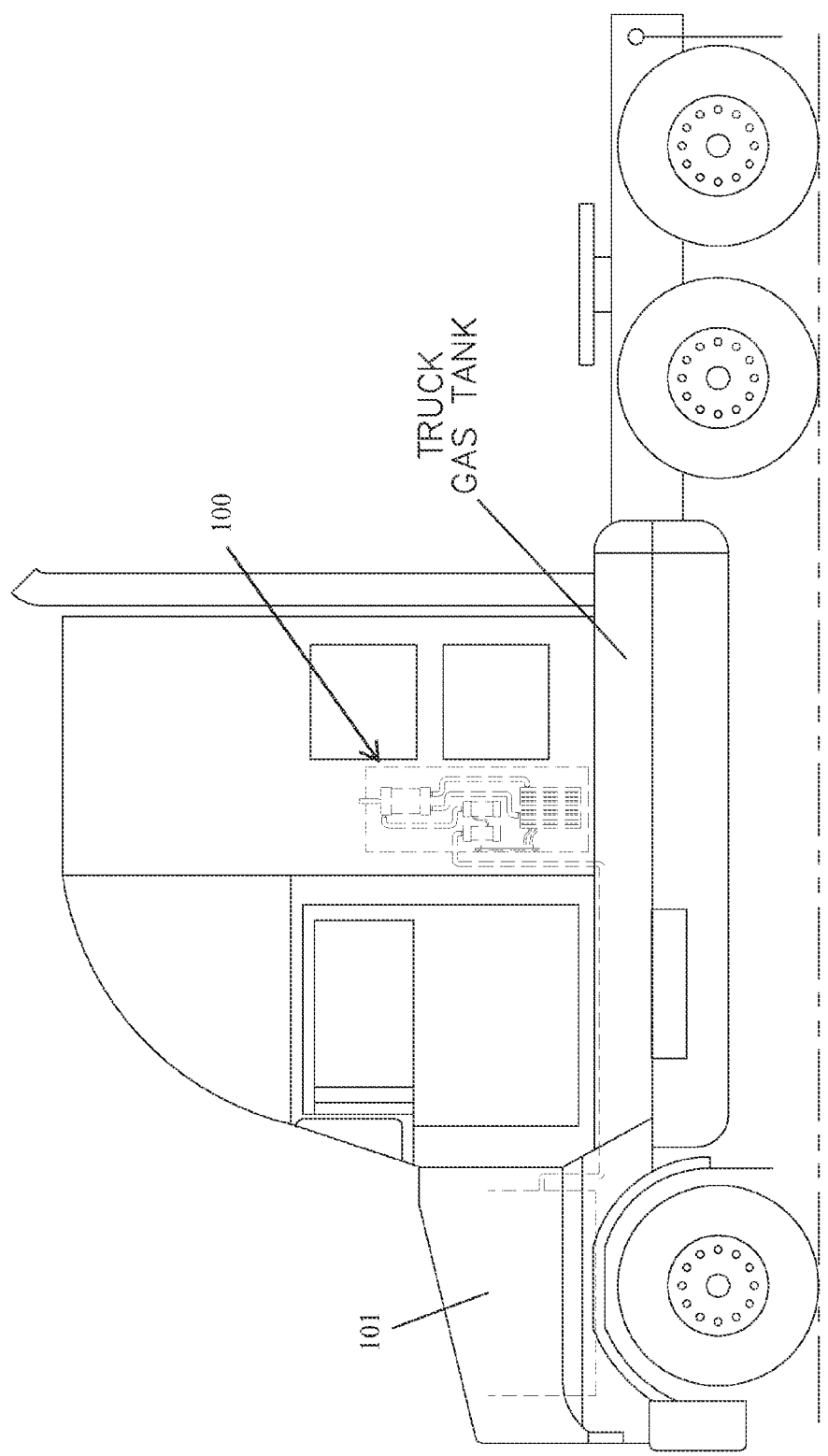
FIG. 2 is a view of an electrolysis system for generating hydrogen gas in use on a truck.
Figure 3:
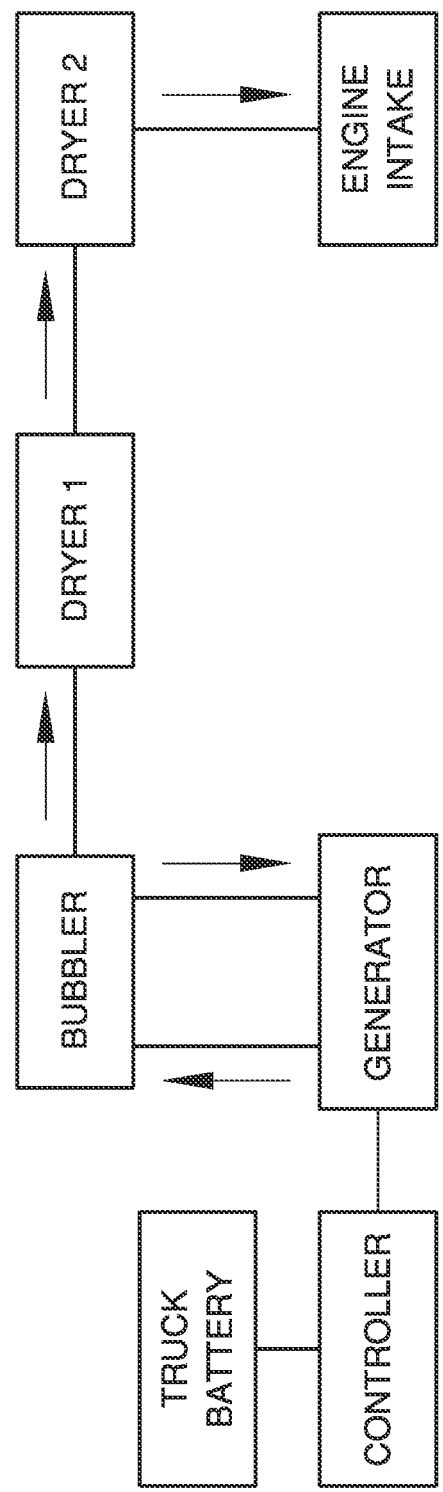
FIG. 3 is a schematic of an electrolysis system for generating hydrogen gas.

Referring now to FIG. 1-3, the present invention features an electrolysis system 100 comprising a generator 110 having an inner cavity adapted to hold water and gases. The system further comprises a first electrode 112a and a second electrode 112b, which are both disposed in the inner cavity of the generator 110. The system further comprises a bubbler reservoir 120 having an inner cavity adapted to hold water and gases. The bubbler reservoir 120 is fluidly connected to the generator 110 via a first hose 140 and via a second hose 240. The first hose 140 is adapted to dispense water from the bubbler reservoir 120 into the generator 110. The second hose 240 is adapted to allow oxygen and hydrogen gas from the generator 110 to rise into the bubbler reservoir 120. In some embodiments, water is allowed to fall into the generator 110 via the second hose 240.

The system further comprises a first dryer 150 (e.g., a housing) having an inner cavity adapted to hold water and gases. The first dryer 150 is generally empty (except for the water that is retained when the gases pass through it). The first dryer 150 is fluidly connected to the bubbler reservoir 120 via a third hose 340. The third hose 340 is adapted to deliver oxygen and hydrogen gas from the bubbler reservoir 120 to the first dryer 150.

The system further comprises a second dryer 250 (e.g., a housing) having an inner cavity adapted to hold acetic acid (or other liquid) and gases. The second dryer 250 is fluidly connected to the first dryer 150 via a fourth hose 440. The fourth hose 440 is adapted to deliver hydrogen gas (and in some embodiments oxygen) from the first dryer 150 to the second dryer 250. The fourth hose 440 having a first end 441 and a second end 442, wherein the first end 441 being connected to the first dryer 150 and the second end 442 being connected to the second dryer 250, wherein the first end 441 is positioned above the second end 442. In some embodiments, the second dryer 250 is about ½ full with the acetic acid (or other liquid). In some embodiments, the second dryer 250 is between about ¼ to ½ full with the acetic acid (or other liquid). In some embodiments, the second dryer 250 is between about ½ to ¾ full of acetic acid or other liquid. In some embodiments, the second dryer 250 comprises a weak acid not limited to acetic acid. The liquid in the second dryer 250 may help remove solids (e.g., iron).

The system further comprises a fifth hose 540 fluidly connected to the second dryer 250 and adapted to connect to an engine 101. The fifth hose 540 is adapted to allow hydrogen gas to pass from the second dryer 250 to the engine 101. The system further comprises a controller 180 operatively connected to the first electrode 112a and the second electrode 112b in the generator 110. The controller 180 is adapted to provide an electric current to the first electrode 112a and the second electrode 112b such that water in the generator 110 is converted to oxygen and hydrogen gas via standard electrolysis.

In some embodiments, the first electrode 112a of the system is stainless steel. In some embodiments, the second electrode 112b of the system is stainless steel. In some embodiments, the system further comprises more than one first electrode 112a. In some embodiments, the system further comprises more than one second electrode 112b. In some embodiments, the first electrode 112a is the positive electrode. In some embodiments, the second electrode 11ba is the negative electrode.

In some embodiments, the controller 180 is operatively connected to the first electrode 112a via a first wire 188a. In some embodiments, the controller 180 is operatively connected to the second electrode 112b via a second wire 188b. In some embodiments, the second wire 188b is a ground wire. In some embodiments, the controller 180 is operatively connected to a battery of a vehicle.

The disclosures of the following U.S. patents are incorporated in their entirety by reference herein: U.S. Pat. No. 3,766,719; U.S. Pat. No. 4,024,848; U.S. Pat. No. 5,096,549; U.S. Pat. No. 5,840,104; Design U.S. Pat. No. D466,949; U.S. Pat. No. 6,823,659.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. An electrolysis system 100 comprising:
    (a) a generator 110 having an inner cavity adapted to hold water and gases, wherein a first electrode 112a and a second electrode 112b are both disposed in the inner cavity of the generator 110;
    (b) a bubbler reservoir 120 having an inner cavity adapted to hold water and gases, the bubbler reservoir 120 is fluidly connected to the generator 110 via a first hose 140 and via a second hose 240, the first hose 140 is adapted to dispense water from the bubbler reservoir 120 into the generator 110 and the second hose 240 is adapted to allow oxygen and hydrogen gas from the generator 110 to rise into the bubbler reservoir 120;
    (c) a first dryer 150 having an inner cavity adapted to hold water and gases, wherein the first dryer 150 comprises water disposed therein, wherein the first dryer 150 is fluidly connected to the bubbler reservoir 120 via a third hose 340, the third hose 340 is adapted to deliver oxygen and hydrogen gas and residual water from the bubbler reservoir 120 to the first dryer 150;
    (d) a second dryer 250 having an inner cavity, wherein the second dryer 250 comprises acetic acid disposed therein, the second dryer 250 is fluidly connected to the first dryer 150 via a fourth hose 440, the fourth hose 440 is adapted to deliver hydrogen gas from the first dryer 150 to the second dryer 250, the fourth hose 440 having a first end 441 and a second end 442, the first end 441 being connected to the first dryer 150 and the second end 442 being connected to the second dryer 250 wherein the first end 441 is positioned above the second end 442;
    (e) a fifth hose 540 fluidly connected to the second dryer 250 and adapted to connect to an engine 101, the fifth hose 540 is adapted to allow hydrogen gas to pass from the second dryer 250 to the engine 101; and
    (f) a controller 180 operatively connected to the first electrode 112a and the second electrode 112b in the generator 110, the controller 180 is adapted to provide an electric current to the first electrode 112a and the second electrode 112b such that water in the generator 110 is converted to oxygen and hydrogen gas via standard electrolysis;
    Wherein the system is filled with water via an opening disposed on the bubbler reservoir 120 fluidly connected to the inner cavity of the generator 110.

2. The electrolysis system 100 of claim 1, wherein the first electrode 112a is stainless steel.

3. The electrolysis system 100 of claim 1, wherein the second electrode 112b is stainless steel.

4. The electrolysis system 100 of claim 1 further comprising more than one first electrode 112a.

5. The electrolysis system 100 of claim 1 further comprising more than one second electrode 112b.

6. The electrolysis system 100 of claim 1, wherein the first electrode 112a is the positive electrode.

7. The electrolysis system 100 of claim 1, wherein the second electrode 11ba is the negative electrode.

8. The electrolysis system 100 of claim 1, wherein the controller 180 is operatively connected to the first electrode 112a via a first wire 188a.

9. The electrolysis system 100 of claim 1, wherein a second wire 188b is a ground wire.

10. The electrolysis system 100 of claim 1, wherein the controller 180 is operatively connected to a battery of a vehicle.

11. An electrolysis system 100 consisting of:
    (a) a generator 110 having an inner cavity adapted to hold water and gases, wherein a first electrode 112a and a second electrode 112b are both disposed in the inner cavity of the generator 110;
    (b) a bubbler reservoir 120 having an inner cavity adapted to hold water and gases, the bubbler reservoir 120 is fluidly connected to the generator 110 via a first hose 140 and via a second hose 240, the first hose 140 is adapted to dispense water from the bubbler reservoir 120 into the generator 110 and the second hose 240 is adapted to allow oxygen and hydrogen gas from the generator 110 to rise into the bubbler reservoir 120;
    (c) a first dryer 150 having an inner cavity adapted to hold water and gases, wherein the first dryer 150 comprises water disposed therein, wherein the first dryer 150 is fluidly connected to the bubbler reservoir 120 via a third hose 340, the third hose 340 is adapted to deliver oxygen and hydrogen gas and residual water from the bubbler reservoir 120 to the first dryer 150;
    (d) a second dryer 250 having an inner cavity, wherein the second dryer 250 consists of acetic acid disposed therein, the second dryer 250 is fluidly connected to the first dryer 150 via a fourth hose 440, the fourth hose 440 is adapted to deliver hydrogen gas from the first dryer 150 to the second dryer 250, the fourth hose 440 having a first end 441 and a second end 442, the first end 441 being connected to the first dryer 150 and the second end 442 being connected to the second dryer 250 wherein the first end 441 is positioned above the second end 442;
    (e) a fifth hose 540 fluidly connected to the second dryer 250 and adapted to connect to an engine 101, the fifth hose 540 is adapted to allow hydrogen gas to pass from the second dryer 250 to the engine 101; and
    (f) a controller 180 operatively connected to the first electrode 112a and the second electrode 112b in the generator 110, the controller 180 is adapted to provide an electric current to the first electrode 112a and the second electrode 112b such that water in the generator 110 is converted to oxygen and hydrogen gas via standard electrolysis;
    Wherein the system is filled with water via an opening disposed on the bubbler reservoir 120 fluidly connected to the inner cavity of the generator 110.

* * * * *